E. H. MESSITER.
RECORDING INSTRUMENT.
APPLICATION FILED SEPT. 25, 1915.

1,255,202.

Patented Feb. 5, 1918.
2 SHEETS—SHEET 1.

INVENTOR
Edwin H. Messiter
BY E. M. Marshall
ATTORNEY

E. H. MESSITER.
RECORDING INSTRUMENT.
APPLICATION FILED SEPT. 25, 1915.

1,255,202.

Patented Feb. 5, 1918.
2 SHEETS—SHEET 2.

INVENTOR
Edwin H. Messiter
BY
E. W. Marshall
ATTORNEY

UNITED STATES PATENT OFFICE.

EDWIN H. MESSITER, OF BROOKLYN, NEW YORK, ASSIGNOR TO ELECTRIC WEIGHING COMPANY, OF NEW YORK, N. Y., A CORPORATION OF NEW YORK.

RECORDING INSTRUMENT.

1,255,202.      Specification of Letters Patent.      Patented Feb. 5, 1918.

Application filed September 25, 1915. Serial No. 52,552.

*To all whom it may concern:*

Be it known that I, EDWIN H. MESSITER, a citizen of the United States of America, and a resident of Brooklyn, Kings county, and State of New York, have invented certain new and useful Improvements in Recording Instruments, of which the following is a specification, reference being had to the accompanying drawings, forming a part thereof.

My invention relates to recording instruments such for example, as are adapted to make a permanent record of electric power consumed, or variations in electric voltage or other pressures, electric current, temperature, or the like.

One object of my invention is to provide a simple and compact recording instrument of the aforesaid character that shall embody means for preparing the record sheet by printing or otherwise producing thereon the coördinate lines and subsequently marking the record on the sheet.

Another object of my invention is to provide a mechanism adapted to utilize a plain paper or a paper with a specially prepared surface, and to produce thereon in accurate relation, both the record line and the coördinate graduating lines which indicate the time and the value recorded.

Another object is to provide a recording instrument so arranged that the record sheet passes continuously over the inner surface of the glass panel in the casing of the instrument, the record being visible, as it is produced on the outer surface of the record sheet, while the stylus which is actuated in response to the variations in the value to be recorded, is behind the paper and invisible.

One of the advantages of my invention arises from the fact that the usual pen or pencil for marking the record is eliminated with all of its attendant difficulties, and a stylus, which is capable of indefinite and continuous use without substantial wear and without any attention, is utilized instead.

Other objects and advantages of my invention will be set forth hereinafter, and in order that my invention may be fully understood, I will now proceed to describe the same in the following specification and then point out the novel features thereof in appended claims.

Referring to the drawings.

Figure 1:
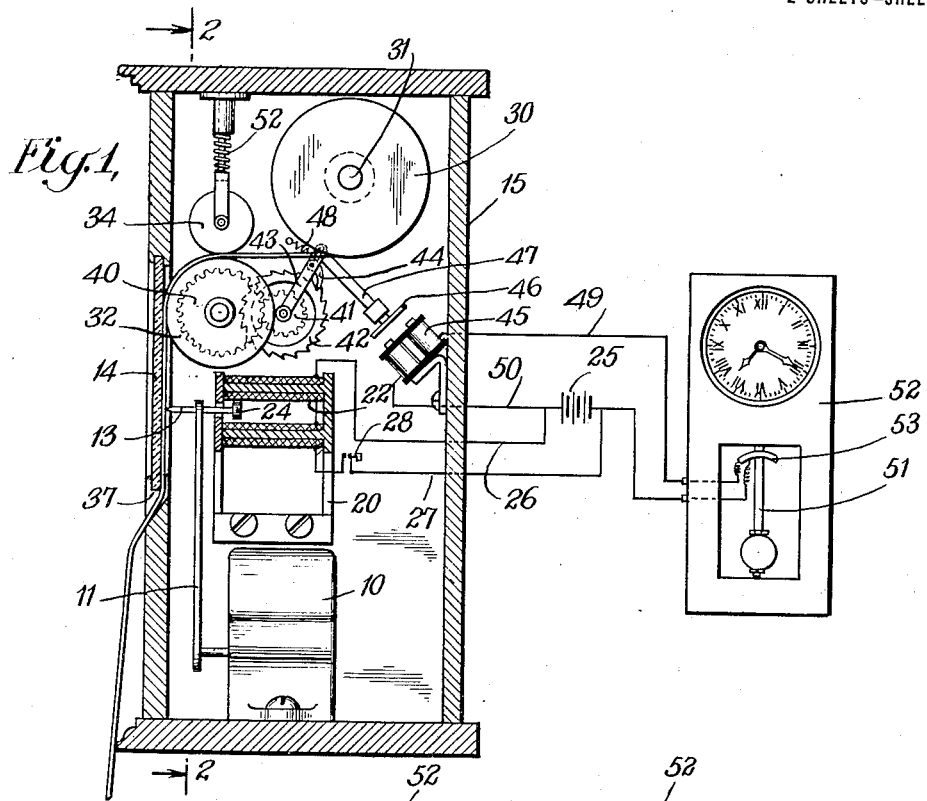
Figure 1 is a partially sectional elevation of a recording instrument arranged and constructed in accordance with my invention, the electric circuit connections of the device being shown diagrammatically.
Figure 2:
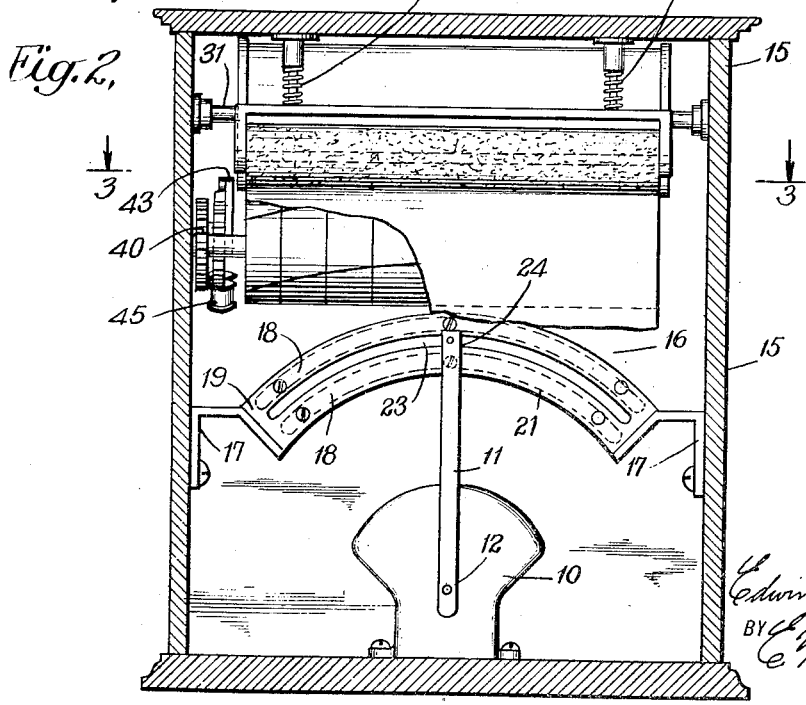
Fig. 2 is a sectional elevation, taken on the line 2—2 of Fig. 1.
Figure 3:
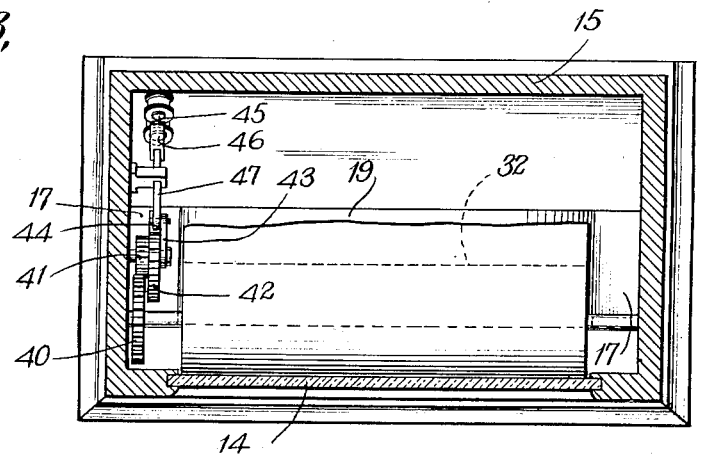
Fig. 3 is a sectional plan view taken on the line 3—3 of Fig. 2.

10 designates an actuating mechanism, such as for example, an electric meter, a thermometer or a pressure gage having an arm 11 which swings about an axis 12 in response to variations in the system to which the meter is connected.

The arm 11 is flexible and carries near its outer end a scriber or stylus 13. The point of the stylus extends at right angles to the inner surface of a glass or other hard transparent panel 14 in the casing of the instrument which is designated by the reference character 15 and in the bottom of which the actuator 10 is mounted. An electro-magnetic device 16 is supported within the casing 15 on brackets 17. It comprises a pair of concentrically curved magnetizable members or poles 18 which extend outwardly from a magnetizable base or plate 19 and are energized by coils 20, and a slotted plate 21 mounted on the poles at their outer ends.

A curved opening 22 is formed between the poles 18 which corresponds in curvature to the slot 23 in the plate 21. An armature 24 which is mounted on the inner end of the stylus 13 is free to move back and forth in the space between the pole pieces as the arm 11 swings on its pivot, the stylus extending outwardly through the slot 23 in the plate 21.

The arrangement of parts is such that when the coils 20 are energized the armature 24, irrespective of the position of the arm 11, is drawn toward the slotted plate 21, which is magnetized and constitutes the pole piece of the magnetic device, and tends to press the point of the stylus against the inner surface of the panel 14.

The coils 20 are connected in any suitable relation and are supplied with energy from a storage battery 25 or other suitable source, through conductors 26 and 27. An interrupter 28 is provided in the circuit for the purpose of energizing and deënergizing the magnetic device. By this means a vibratory motion is imparted to the stylus which, therefore does not interfere with the transverse movement of the stylus or gradual advancement of the paper on which the record is made. These movements are, however, so slow relative to the rate at which the stylus vibrates that the record line has the appearance of being continuous.

Although my invention is not limited in this respect, I prefer to employ a special kind of paper known commercially as "non-carbon paper" and which is characterized by the fact that when marks are made on one side by means of a stylus or by the pressure of type or the like, the marks are all clearly reproduced on the opposite side of the paper although no marks may appear on the side which is actually engaged by the stylus or type.

In the drawings, 30 indicates a roll of paper of the aforesaid character mounted on a shaft or spindle 31. 32 is a combination printing and feed roll over which the paper passes as clearly shown in Fig. 1.

Figure 4:
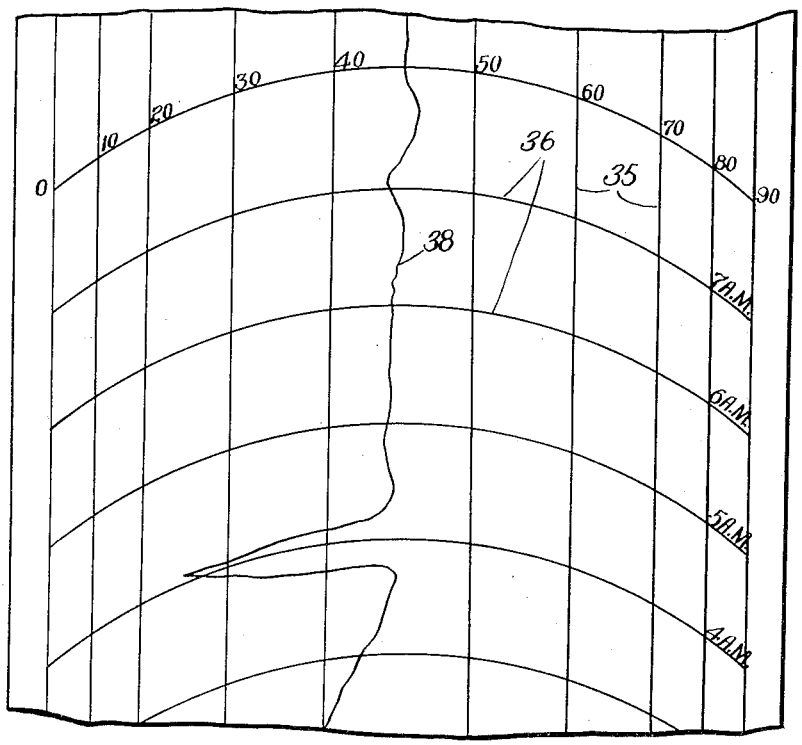
Fig. 4 shows a portion of a complete record produced in the instrument of the preceding figures.

The surface of the roll 32 is formed with raised lines and figures arranged to produce, on the outer surface of the paper (which is engaged by a pressure roll 34), coördinate lines 35 and 36 as shown in Fig. 4.

The axis of the roll 32 is parallel with the surface of the transparent plate 14 and its periphery is close to the plate so that the paper extends downwardly over the inner surface of the transparent plate and out through an opening 37 in the cabinet.

It is interposed between the transparent plate and the point of the stylus 13, as is shown in Fig. 1, and its back surface is engaged by the stylus as hereinbefore described. The stylus pressing against the back of the paper produces on the face of the paper a line as, for example, line 38 in Fig. 4, which indicates the variations in the values in response to which the meter 10 actuates the arm 11.

As before indicated, rolls 32 and 34 coöperate in feeding the paper forward and any suitable means for turning the roll 32 may be employed. For example, I have shown a gear wheel 30 secured to the roll 32 and meshing with a pinion 41 which forms a part of a ratchet wheel 42.

An arm 43 is pivotally mounted on a coincident axis with the pinion 41 and the ratchet wheel 42, and carries a pawl 44 which is adapted to engage the teeth of the ratchet wheel 42. The arm 43 is advanced at a rate which corresponds to the time coördinates 36 on the printing roll 32 and the actual lapse of time.

A convenient means of actuating the arm is shown in Fig. 1 and comprises an electromagnet 45 having a movable armature 46 which is connected by a line 47 with the arm 43.

When the magnet 45 is energized it attracts the armature 46 and moves the arm 43 in opposition to a spring 48, the stroke of the armature being sufficient to permit the ratchet wheel to advance a distance equal to one notch. Consequently when the magnet is deënergized and the spring 48 pulls the arm back, the pawl falls into the next notch of the ratchet wheel 42.

The magnet 45 is connected to the source of energy 25 through conductors 49 and 50, the circuit being successively completed and interrupted as the pendulum 51 of a clock or other chronometer 52 swings forward and backward. This may be accomplished by any suitable means such as, for example, a sealed tube 53 containing mercury and having contacts which are bridged as the tube is tilted by the pendulum to which it may be secured.

Since the panel 14 is plate glass or other transparent material, the outer surface of the paper on which the record is being produced, is visible at all times, although the stencil which engages the back of the paper is not visible.

The pressure roll 34 holds the paper against the surface of the printing roll 32 with sufficient force to produce the coördinate lines on the outer surface of the paper, the pressure roll being held against the surface of the printing and feed roll by springs 52. The pressure roll 34 is free to turn and does turn with the printing roll 32 against which it is pressed,—in fact, the pressure roll 34 may also be positively driven as, for example, by gearing it to the roll 32.

Attention is particularly directed to the fact that the feeding and printing of the record strip is accomplished just prior to the marking of the record thereon and hence the zero of the record is always accurate relative to the stylus positions.

When record strips are first printed and then fed into a recording instrument, in accordance with usual practice, the strip is sure to have a certain amount of displacement which introduces an inaccuracy in the record. This is obviously impossible with the arrangement of my invention because the strip may creep or be laterally displaced but the printed coördinate will always bear a fixed relation to the stylus so long as the printing roll is maintained in position.

The structural arrangement and details of the recording instrument illustrated, may, of course, be varied without departing from the spirit and scope of my invention, and I intend that only such limitations be imposed as are indicated in the appended claims.

What I claim is:

1. A recording instrument comprising a transparent plate, a printing member, means for feeding a continuous strip of fabric so as to receive an impression from said printing member, and means adapted to press upon the back of the sheet opposite the transparent plate, for making a record only on the face of the sheet, said means being responsive to a variable to be recorded.

2. A recording instrument comprising a transparent plate, a printing drum, means for feeding a strip of fabric over the drum, and adjacent to the transparent plate, a stylus for marking a record only on the outer surface of the sheet by pressing it against the transparent plate, and means responsive to a variable to be recorded for adjusting the position of the stylus.

3. A recording instrument comprising a transparent plate, a printing drum, means for pressing a strip of fabric against the drum, whereby coördinate lines are formed thereon, means for rotating the printing drum to feed the fabric adjacent to the transparent plate, a stylus for marking the record only on the outer surface of the sheet by pressing it against the transparent plate, said stylus being responsive to the variable to be recorded.

4. In a recording instrument, a transparent member, means for feeding a strip of prepared fabric close to the inner surface of the member, and means for making a record only on the outer surface of the fabric, that shall be visible from the outside of the transparent member, by marking on the inner surface of the fabric.

5. In a recording instrument, a casing having a transparent panel, means for feeding a strip of paper close to the panel on the inside of the casing, and means for producing a record by marking on the inner surface of the paper, said paper being characterized by the fact that the record marks are visible only on the surface adjacent to the panel, whereby the record is visible.

6. In a recording instrument, a marker, means for actuating the marker, a transparent plate forming a surface for the marker, a record sheet on the inner surface of the pane adapted to be engaged by the marker, said sheet being characterized by the fact that marks made on one side are visible only on the opposite side, whereby the record is visible through the panel.

7. A recording instrument comprising a casing having a plate glass panel, a marker within the casing adjacent to the surface of the glass panel, means for actuating the marker in response to a variable to be recorded, a record sheet interposed between the glass panel and the marker and characterized by the fact that marks made on its inner surface are visible on the opposite surface, and means for vibrating the marker into and out of engagement with the record sheet, whereby a dotted or broken line is visible from the outside of the casing through the panel.

8. A recording instrument comprising a casing having a plate glass panel, a marker within the casing adjacent to the surface of the glass panel, means for actuating the marker in response to a variable to be recorded, a record sheet interposed between the glass panel and the marker and characterized by the fact that marks made on its inner surface are visible on the opposite surface, and means independent of the aforesaid actuating means for vibrating the marker into and out of engagement with the record sheet, whereby a dotted or broken line is visible from the outside of the casing through the panel.

9. A recording instrument comprising a casing having a plate glass panel, a marker within the casing adjacent to the surface of the glass panel, means for actuating the marker in response to a variable to be recorded, a record sheet interposed between the glass panel and the marker and characterized by the fact that marks made on its inner surface are visible on the opposite surface, and means for vibrating the marker into and out of engagement with the record sheet, and means for feeding the record sheet at a predetermined rate.

10. A recording instrument comprising a casing having a glass panel, constituting a marking surface, a stylus adjacent to the surface, means for actuating the stylus transversely of the panel in response to a variable to be recorded, a record sheet characterized by the fact that marks made on its inner surface are visible on the opposite surface, a printing roll for producing coördinate lines on the record sheet, a pressure roll coöperating with the printing roll, and electro-responsive means for actuating the printing roll to feed the record strip between the glass panel and the stylus.

11. A recording instrument comprising a casing having a glass panel constituting a marking surface, a stylus adjacent to the surface, means for actuating the stylus transversely of the panel in response to a variable to be recorded, a record sheet characterized by the fact that marks made on its inner surface are visible on the opposite surface, a printing roll for producing coördinate lines on the record sheet, a pressure roll coöperating with the printing roll, electro-responsive means for actuating the printing roll to feed the record strip between the glass panel and the stylus, and electro-responsive means for vibrating the stylus into and out of engagement with the panel.

12. A recording instrument comprising a casing having a glass panel constituting a marking surface, a stylus adjacent to the surface, means for actuating the stylus transversely of the panel in response to a variable to be recorded, a record sheet characterized by the fact that marks made on its inner surface are only visible on the opposite surface, a printing roll for producing coördinate lines on the record sheet, a pressure roll coöperating with the printing roll, a chronometer, and means dependent thereon for actuating the printing roll to feed the record strip between the glass panel and the stylus.

13. A recording instrument comprising a casing having a glass panel constituting a marking surface, a stylus adjacent to the surface, means for actuating the stylus transversely of the panel in response to a variable to be recorded, a record sheet characterized by the fact that marks made on its inner surface are only visible on the opposite surface, a printing roll for producing coördinate lines on the record sheet, a pressure roll coöperating with the printing roll, a chronometer, and means dependent thereon for feeding the strip between the glass panel and the stylus.

14. A recording instrument comprising a casing having a glass panel constituting a marking surface, a stylus adjacent to the surface, means for actuating the stylus transversely of the panel in response to a variable to be recorded, a record sheet characterized by the fact that marks made on its inner surface are only visible on the opposite surface, means for producing coördinate lines on the record sheet, a pressure roll coöperating with the printing roll, and means for feeding the strip between the glass panel and the stylus.

15. A recording instrument comprising a casing having a glass panel constituting a marking surface, a stylus adjacent to the surface, means for actuating the stylus transversely of the panel in response to a variable to be recorded, a record sheet characterized by the fact that marks made on its inner surface are only visible on the opposite surface, means for producing coördinate lines on the record sheet, a pressure roll coöperating with the printing roll, a chronometer, and means dependent thereon for feeding the strip between the glass panel and the stylus.

16. A recording instrument comprising means for feeding a strip of fabric to receive a record, a pivoted stylus movable about its pivot in response to the variable to be recorded for marking a record on the fabric, and means for vibrating the stylus comprising an electro-magnet having a curvature with the pivot of the stylus as a center, and means for energizing said electro-magnet pulsatingly.

17. A recording instrument comprising means for feeding a strip of fabric to receive a record, a pivoted stylus movable about its pivot in response to the variable to be recorded for making a record on the fabric and means for vibrating the stylus, comprising an electromagnet having a pole piece provided with a slot having a curvature with the pivot of the stylus as a center, an armature therefor, a rigid connection between the armature and the stylus passing through the curved slot, and means for energizing said electromagnet pulsatingly.

18. In a recording instrument, the combination with a transparent plate, and a printing member, of a strip of record fabric adapted to exhibit a record only on one surface when an impression is made on the opposite surface, means for feeding said record strip so as to receive an impression from said printing member, and means adapted to press upon the back of the sheet opposite the transparent plate for making a record only on the face of the record sheet, said means being responsive to a variable to be recorded.

19. A recording instrument comprising a transparent pressure plate, a continuous record strip adapted to have a record produced on one surface by moving a stylus into engagement with the opposite surface, means for passing the record continuously over the surface of the transparent plate with the record surface outward, a stylus close to the inner surface of the record strip, means dependent upon the value to be recorded for adjusting the position of the stylus, and means for continuously producing a rapid vibration of the stylus into and out of engagement with the record strip to avoid interfering with the continuous movement of the strip and to produce a permanent record on the outer surface of the strip.

In witness whereof I have hereunto set my hand this 23rd day of September, 1915.

EDWIN H. MESSITER.